United States Patent
Fritz et al.

(10) Patent No.: US 9,812,873 B2
(45) Date of Patent: Nov. 7, 2017

(54) VIRTUAL CHANNEL ABSTRACTION LAYER FOR SOLID STATE POWER CONTROLS

(71) Applicant: Hamilton Sundstrand Corporation, Windsor Locks, CT (US)

(72) Inventors: Kevin Case Fritz, Rockford, IL (US); John A. Dickey, Caledonia, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 415 days.

(21) Appl. No.: 14/556,591

(22) Filed: Dec. 1, 2014

(65) Prior Publication Data

US 2016/0156194 A1   Jun. 2, 2016

(51) Int. Cl.
| | |
|---|---|
| H02J 4/00 | (2006.01) |
| H02J 13/00 | (2006.01) |
| H02H 1/00 | (2006.01) |
| H02J 1/08 | (2006.01) |

(52) U.S. Cl.
CPC ............. *H02J 4/00* (2013.01); *H02H 1/0092* (2013.01); *H02J 13/0062* (2013.01); *B64D 2221/00* (2013.01); *H02J 1/08* (2013.01)

(58) Field of Classification Search
CPC ..... H02J 4/00; B64D 2221/00; H02H 1/0061; H02H 1/0092
See application file for complete search history.

(56) References Cited

U.S. PATENT DOCUMENTS

| | | | | |
|---|---|---|---|---|
| 5,752,047 | A * | 5/1998 | Darty | G06F 1/26 361/2 |
| 6,563,831 | B1 | 5/2003 | Dally et al. | |
| 7,310,670 | B1 | 12/2007 | Walbeck et al. | |
| 7,505,820 | B2 * | 3/2009 | Plivcic | H02J 1/14 307/43 |
| 7,634,329 | B2 * | 12/2009 | Liu | G05B 23/0213 700/292 |
| 7,656,634 | B2 | 2/2010 | Robertson et al. | |
| 7,747,879 | B2 | 6/2010 | Tofigh et al. | |
| 8,547,675 | B2 | 10/2013 | Maier | |
| 8,704,574 | B2 * | 4/2014 | Prabhuk | H02J 1/08 327/202 |
| 2006/0200688 | A1 | 9/2006 | Tofigh et al. | |

(Continued)

FOREIGN PATENT DOCUMENTS

EP   1928090   6/2008

*Primary Examiner* — Ryan Johnson
(74) *Attorney, Agent, or Firm* — Carlson, Gaskey & Olds, P.C.

(57) ABSTRACT

A multi-channel power controller includes a main controller communicatively coupled to a plurality of standard power control circuit boards. Each of the standard power controller circuit boards includes a nexus having a plurality of virtual channels and a plurality of solid state power controllers. Each of the solid state power controllers is controlled by one of the virtual channels. A plurality of physical control channels operable to control power to at least one load. Each physical control channel of the plurality of physical control channels is controlled by a corresponding solid state power controller of the plurality of solid state power controllers. At least one of the virtual channels controls more than one of the physical control channels in the plurality of physical control channels.

14 Claims, 3 Drawing Sheets

(56) References Cited

U.S. PATENT DOCUMENTS

2011/0222200 A1 9/2011 Fuller et al.
2012/0072635 A1 3/2012 Yoshida et al.
2013/0050880 A1 2/2013 Rozman et al.

* cited by examiner

VIRTUAL CHANNEL ABSTRACTION LAYER FOR SOLID STATE POWER CONTROLS

TECHNICAL FIELD

The present disclosure relates generally to power controllers, and more specifically to a virtual channel abstraction layer for a multi-channel power controller configuration.

BACKGROUND

Modern aircraft utilize multiple electrical power systems throughout the aircraft to provide power to the various aircraft systems. In some aircraft, each electrical system is controlled via a dedicated power controller or set of power controllers. The power controllers include an on/off switch as well as associated sensing electronics for determining the state of the power controller and/or the controlled electronics. The power controllers are, in some examples, solid state power controllers (SSPCs). In order to control each of the power controllers, a main control unit receives a status signal from each power controller and outputs control instructions to each of the power controllers through a corresponding physical control channel dedicated to the power controller. The main control unit can be any suitable type of digital controller.

In modern electronic control systems solid state power controllers (SSPCs) are used for switching control and circuit breaker functions. Depending on the size of the load and the wire used, different amperage or capacity SSPCs are required for different loads. Traditionally this was accomplished by building physically different sized SSPC units on control circuit boards as needed for the specific application. This results in the need for many different versions of control circuit boards with varying combinations of SSPC ratings.

SUMMARY OF THE INVENTION

In one exemplary embodiment, a multi-channel power controller includes a main controller communicatively coupled to a plurality of standard power control circuit boards. Each of the standard power control circuit boards includes a nexus having a plurality of virtual channels and a plurality of solid state power controllers. Each of the solid state power controllers is controlled by one of the virtual channels. A plurality of physical control channels operable to control power to at least one load. Each physical control channel of the plurality of physical control channels is controlled by a corresponding solid state power controller of the plurality of solid state power controllers. At least one of the virtual channels controls more than one of the physical control channels in the plurality of physical control channels.

An exemplary method for controlling multiple solid state power controllers using a main control unit includes outputting a control message from the main control unit, converting the control message into a plurality of control signals for a ganged set of solid state power controllers using a virtual channel module within a nexus component, and providing each of the plurality of control signals to a corresponding solid state power controller in the ganged set of solid state power controllers.

These and other features of the present invention can be best understood from the following specification and drawings, the following of which is a brief description.

DETAILED DESCRIPTION OF AN EMBODIMENT

Disclosed herein is a single size standard power controller board including many iterations of a base capacity SSPC on the board. When different sized SSPCs are needed for a given load or configuration, different numbers of the base capacity SSPCs are grouped (ganged) together to form virtual channels that operate and report in the same manner that older version single larger SSPCs operate and report. In order to accomplish the ganging, the outputs of the new SSPCs are tied together in varying group sizes and the control and reporting of the individual channels is aggregated to appear to a main system controller as a single SSPC. Control and status logic and connectivity required to accomplish the virtual channel groupings is discussed in further detail below.

Figure 1:
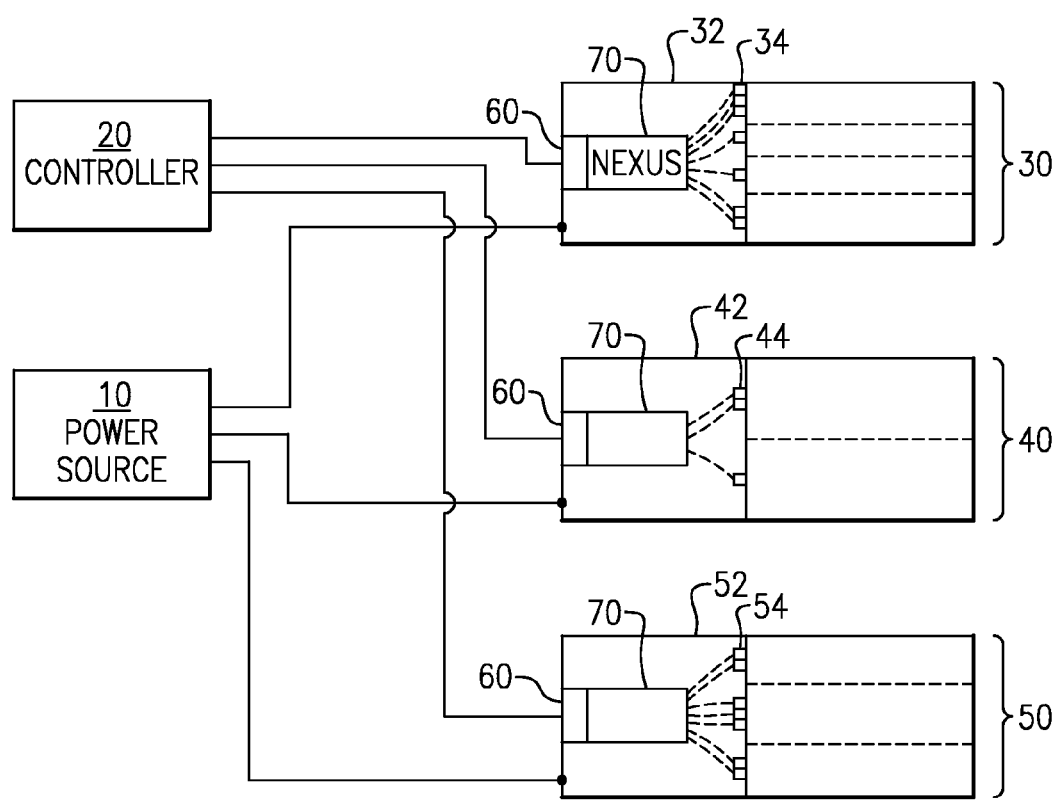
FIG. 1 schematically illustrates an electrical system including multiple load sets having loads with varied power requirements.

FIG. 1 schematically illustrates an electronic system including multiple load sets 30, 40, 50. Each of the load sets 30, 40, 50 includes a corresponding standard power controller circuit board 32, 42, 52. The standard power controller circuit boards 32, 42, 52 control the flow of power from a power source 10 to the loads within the load set 30, 40, 50. Each standard power controller circuit board 32, 42, 52 includes multiple SSPCs 34, 44, 54 that can be arranged as a ganged grouping of SSPCs 34, 44, 54 or independently, depending on the needs and requirements of the corresponding load set 30, 40, 50. Also connecting each power controller circuit board 32, 42, 52 to a main control unit 20 is a gateway element 60. The gateway element 60 facilitates communication between the main control unit 20 and the corresponding standard power controller circuit board 32, 42, 52. The gateway element 60 also communicates with a nexus 70 contained within each standard power controller circuit board 32, 42, 52.

The gateway element 60 receives an instruction from the main control unit 20 and outputs a converted instruction to the corresponding nexus 70. For any given ganged channel of SSPCs 34, 44, 54, the nexus 70 receives the statuses of each of the SSPCs 34, 44, 54 and combines the statuses into a single status for the gateway element 60 to transmit to the main control unit 20. Similarly, the nexus 70 receives the instruction from the gateway element 60 and unpacks the instruction into distinct instructions provided to each of the corresponding SSPCs 34, 44, 54 within the standard power controller circuit board 32, 42, 52.

Ganging channels together provides architectural and operational advantages because the control channels can act as several independent units or as a combined single channel, depending on a particular programmed configuration of the main control unit 20. However, ganging channels together creates a system complexity because the control signals transmitted over the ganged channels must be synchronized with each other. By way of example, if the main control unit 20 transmits a command to turn SSPCs 34, 44,

54 on, the turn on command must go to all of the ganged SSPCs 34, 44, 54 at the same time. If the turn on command is not received at each SSPC 34, 44, 54 within a given standard power controller circuit board 32, 42, 52 at the same time, stresses can occur on the corresponding load set (the electrical system) or on the control circuitry within the power controller.

Similarly, when transmitted independently, the status responses of the ganged SSPCs 34, 44, 54 must reach the main control unit 20 as a single status signal. As with the control instructions, if the status responses are not received simultaneously, the combined status response can inaccurately reflect the statuses of the SSPCs 34, 44, 54 at any given time, and additional stresses on the main control unit 20 or the overall system can be incurred.

By way of example, in systems using discrete physical channels for each SSPC 34, 44, 54, messages transmitted at the same time from the main control unit 20 can be received at different power controllers at different times, even in the same set of ganged power controllers, due to system latencies, varied communication data rates or other similar conditions.

By positioning the nexus 70 in, or physically proximate, the standard power controller circuit board 32, 42, 52, or within the electronic system 50 receiving power through the standard power controller circuit board 32, 42, 52, the varied latencies, varied communication data rates and other variations between individual physical channels are minimized, thereby better ensuring simultaneous or approximately simultaneous receipt of the control instruction at the SSPCs 34, 44, 54 within the standard power controller circuit board 32, 42, 52. Similarly, the close proximate position of the nexus 70 to the power controllers within the standard power controller circuit board 32, 42, 52 ensures that independent statuses of each of the corresponding SSPCs 34, 44, 54 is received at approximately the same time at the nexus 70, and combined into a single status report prior to being transmitted to the main control unit 20.

Figure 2:
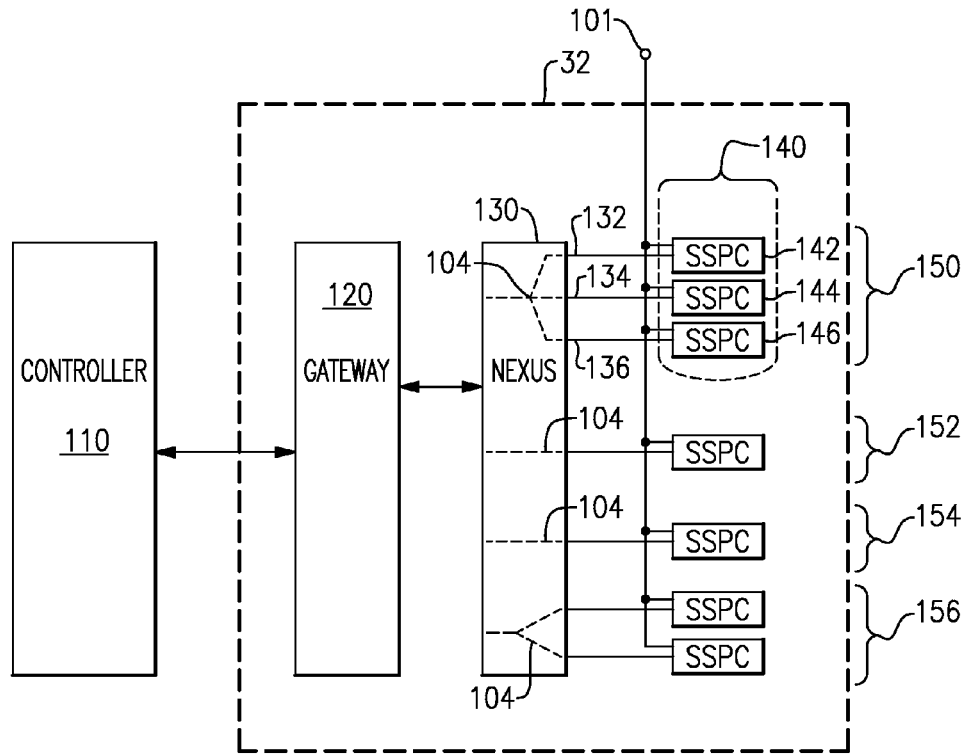
FIG. 2 schematically illustrates a power control arrangement for one of the load sets of FIG. 1.

FIG. 2 schematically illustrates a power control arrangement for one of the load sets 30 of FIG. 1. The power control arrangement of FIG. 2 includes four control channels 150, 152, 154, 156 each operable to control a load set, such as the load set 30 illustrated in FIG. 1. Each of the load sets includes loads having varying power requirements with a corresponding varying number of SSPC's 142, 144, 146 being required to control power supply from a power source 101 to the load set. A gateway element 120 connects a main control unit 110 to the nexus 130.

The uppermost control channel 150 is an exemplary control channel including a virtual channel 104 within the nexus 130 and physical channels 132, 134, 136 providing controls to the corresponding SSPCs 142, 144, 146. Each of the additional control channels 152, 154, 156 is arranged in a similar configuration, with a corresponding virtual channel 104 within the nexus element 130 and with each of the virtual channels providing control signals to all of the corresponding SSPCs over physical channel outputs.

By utilizing the virtual channels 104 in the nexus 130, including virtual channels 104 corresponding to multiple distinct power controllers for the same load within the load set 30, the processing overhead of the main control unit 110 is reduced, the processing requirement for the gateway element 120 is reduced, and the total communications bandwidth required to transmit control signals from the main control unit 110 to the SSPCs is reduced. Further, the potential for parallaxed commands due to latency, or other transmission defects, is reduced as the single message for any set of ganged SSPCs is not unpacked until the command is received at the nexus 130.

While illustrated as virtual channels 104 within the nexus 130, the virtual channels 104 are an abstraction representing the transmission of a single data signal along a data bus. By way of example, the transmission of an ON/OFF instruction to a set of ganged SSPCs can be a single instruction specified in an array notation indicating which physical channels 132, 134, 136 are included in the ganged set of power controllers 140. Further, each of the virtual channels 104 can utilize the same data bus for message transmission or different data busses depending on the needs and configuration of a nexus 130 component for a given system.

During practical operation, when the main control unit 110 issues a command signal for a given virtual channel 104, the main control unit 110 sends only a single command to the corresponding nexus 130 regardless of the number of power controllers 142, 144, 146 in the set of ganged power controllers 140 receiving the command. The message refers to each distinct power controller 142, 144, 146 within the set of ganged power controllers 140 in an array and provides the command to the entire array. In other words, the main control unit 110 transmits initialization configuration data that tells the nexus 130 how to group the individual physical channels and then sends commands for On/Off, etc. as if each group were a single channel. In some examples, the command utilizes a specific array notation to refer to the specific physical channels that are part of the ganged set of power controllers.

Figure 3:
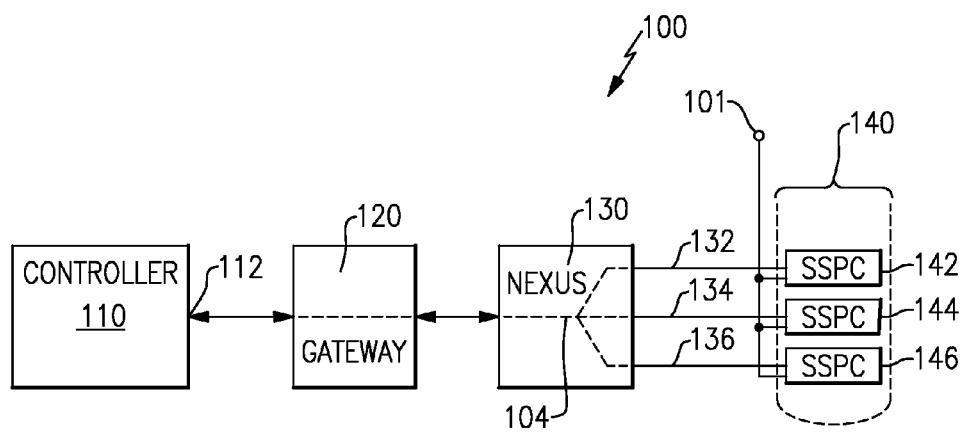
FIG. 3 schematically illustrates a power control arrangement for one of the loads of the load set of FIG. 2.

With continued reference to FIG. 2, and with like numerals indicating like elements, FIG. 3 schematically illustrates a power control arrangement for a single exemplary load of the load set 30 controlled by the power control arrangement of FIG. 2. The illustrated portion 100 includes a single ganged set 140 of SSPCs 142, 144, 146 controlled by a main control unit 110. The power control arrangement includes a virtual channel 104 within the nexus 130. A single signal corresponding to all SSPCs 142, 144, 146 in the ganged set 140 is sent from the main control unit 110. The signal is transmitted over a data bus to the gateway element 120. The signal is then provided from the gateway element 120 to the nexus 130. The nexus 130 receives the signal and converts the signal into multiple distinct physical channel signals using the virtual channel 104. Each physical channel signal is then transmitted to a corresponding SSPC 142, 144, 146 in the ganged set 140 of power controllers 142, 144, 146 along a corresponding physical channel 132, 134, 136.

Similarly, power controller statuses are provided from the SSPCs 142, 144, 146 in the ganged set 140 of SSPCs 142, 144, 146 in a reverse direction. During the reverse process the status reports are combined by the nexus 130 in the virtual channel 104, and a single status report is transmitted to the main controller 110.

In this way, the virtual channel 104 is a data abstraction representing a single channel corresponding to a grouping of physical channels. While described herein as corresponding to a grouping of three physical channels, one of skill in the art, having the benefit of this disclosure, will understand that each virtual channel 104 in a given nexus 130 can correspond to any number of physical channels. In some examples, one or more virtual channels 104 included in a control system will each correspond to only a single power controller 142, 144, 146. In such a case, the virtual channel abstraction functions similar to existing physical channels.

Figure 4:
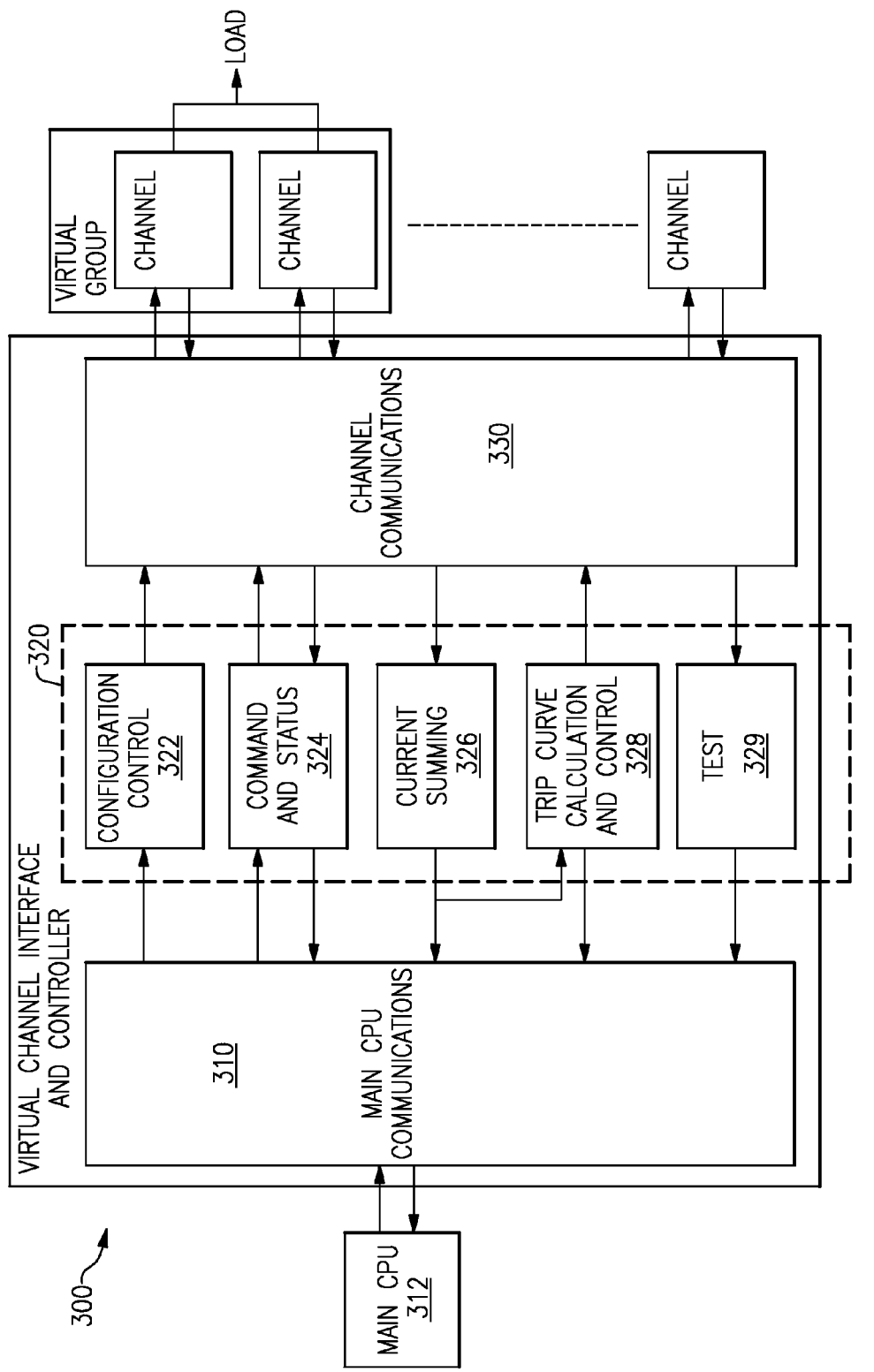
FIG. 4 schematically illustrates an exemplary virtual channel controller.

FIG. 4 schematically illustrates an exemplary nexus, such as the nexus 130 of FIGS. 2 and 3. The nexus 300 can be implemented as a physical controller having distinct physical modules, a software controller or module, or a hybrid including physical modules and software modules.

The nexus 300 is interfaced with a processor of the main control unit via a main CPU communications interface module 310. The main CPU communications interface module 310 receives instructions from, and communications with, a main CPU 312 in the main control unit along a single communication link 314. The instructions and information from the main CPU 312 are routed by the main CPU communications module 310 to an appropriate processing module 320.

The exemplary virtual channel controller 300 includes five processing modules 320: a configuration control module 322, a command and status module 324, a current summing module 326, a trip curve calculation and control module 328 and a test module 329. The configuration control module 322 configures the virtual channel arrangement, and controls which physical channels are ganged together on a corresponding virtual channel. In alternative examples, the nexus 300 can contain other functions or function modules as well, depending on the needs of a particular system. In some examples, everything within the nexus 300 is likely to be implemented as a single field programmable gate array (FPGA.) The communications interface module 310, in some examples, the communications gateway 120, referred to in FIGS. 2 and 3.

The command and status module 324 receives commands from the communications gateway 312 and passes the commands along the appropriate virtual channel to a set of corresponding power controllers. Similarly, the command and status module 324 receives a status reply from a corresponding virtual channel and provides the aggregate of these status replies to the communications gateway 312.

The current summing module monitors the currents in the connected power controllers, as reported in the status reports, and provides the summed currents to the main CPU for further monitoring and to the trip curve calculation and control module 328. The trip curve calculation and control module 328 analyzes the summed current values and determines if a fault is occurring, or any other current based event that requires tripping the power controller to off is occurring. The trip curve calculation and control module 328 then communicates this determination back to the main CPU and to a channel communications module 330.

The test module 329 monitors the self-health of the virtual channel interface and controller and the health of the individual physical channels, and provides the determination back to the main CPU 312.

The channel communications module 330 converts the instructions from the processing modules 320 into virtual channel communications suitable for transmission over the data bus, or data busses. As described above the nexus receiving the instruction from the virtual channel converts the instruction into an appropriate number of physical channel signals, and transmits the physical channel signals through the virtual channels back to the virtual channel controller 300. The channel communications module 330 also interfaces incoming signals from the virtual channels with the processing modules 320.

Further, each of the modules 322, 324, 326, 328, 329 is capable of discerning what information is needed by the main CPU 312 and what information is only needed locally. The information that is only needed locally is then withheld, and only the information needed by the main CPU 312 is transmitted to the main CPU.

In some examples, each of said solid state power controllers can communicate a state of the solid state power controller to the nexus. The nexus can then interpret the state using one or more modules, and determine if the interpretation should be transmitted back to the main CPU 312, or dealt with at the nexus 300 level. By way of example, some possible SSPC states include an on state, a failed state, a load fault trip condition, a channel fault and an open load state. The on state represents a solid state power controller that is on and functional, the failed state represents a solid state power controller that is undergoing a failure mode, the load fault represents a fault condition in the connected load, and the open load state represents a solid state power controller that is connected to an open load.

While described above as a physical component, the nexus can be either a physical component, or a sub process run on a processor element of a given electronic system.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A multi-channel power controller comprising:
   a main controller communicatively coupled to a plurality of standard power control circuit boards;
   each of said standard power controller circuit boards including a nexus having a plurality of virtual channels and a plurality of solid state power controllers, wherein each of said solid state power controllers is controlled by one of said virtual channels;
   a plurality of physical control channels operable to control power to at least one load, wherein each physical control channel of said plurality of physical control channels is controlled by a corresponding solid state power controller of said plurality of solid state power controllers; and
   wherein at least one of said virtual channels controls more than one of said physical control channels in said plurality of physical control channels.

2. The multi-channel solid state power controller of claim 1, wherein at least two of said virtual channels control corresponding ganged sets of two or more of said solid state power controllers.

3. The multi-channel solid state power controller of claim 1, wherein said nexus comprises an abstraction module, and wherein the abstraction module is operable to combine a status of each solid state power controller in a set of ganged solid state power controllers into a single status message such that the single status message can be transmitted to the main controller.

4. The multi-channel solid state power controller of claim 1, further comprising a communication gateway connecting said nexus to said main controller unit.

5. The multi-channel solid state power controller of claim 1,
   wherein each of said solid state power controllers is operable to communicate a state of the solid state power controller to said nexus, and wherein said state is one of an on state, a failed state, a load fault trip condition, and an open load state; and
   wherein the on state represents a solid state power controller that is on and functional, the failed state represents a solid state power controller that is undergoing a failure mode, the load fault trip condition represents a short circuit within an attached load, and the open load state represents a solid state power controller that is connected to an open load.

6. The multi-channel solid state power controller of claim 1,
wherein a quantity of the plurality of virtual channels corresponds to a quantity of sets of solid state power controllers in said plurality of solid state power controllers; and
wherein the number of sets of solid state power controllers is configurable.

7. The multi-channel solid state power controller of claim 6, wherein a set of solid state power controllers comprises one or more of a single solid state power controller and one or more groupings of ganged solid state power controllers.

8. The multi-channel solid state power controller of claim 1, wherein each of said standard power controller circuit boards includes a gateway module, a nexus component and a plurality of solid state power controllers.

9. A method for controlling multiple solid state power controllers using a main control unit comprising:
outputting a control message from said main control unit;
converting said control message into a plurality of control signals for a ganged set of solid state power controllers using a virtual channel module within a nexus component, wherein at least one virtual channel in the virtual channel module controls more than one corresponding solid state power controller; and
providing each of the plurality of control signals to a corresponding solid state power controller in said ganged set of solid state power controllers.

10. The method of claim 9, further comprising receiving a status of each connected solid state power controller at said nexus.

11. A method for controlling multiple solid state power controllers using a main control unit comprising:
outputting a control message from said main control unit;
converting said control message into a plurality of control signals for a ganged set of solid state power controllers using a virtual channel module within a nexus component;
receiving a status of each connected solid state power controller at said nexus and combining a status of each solid state power controller in a set of ganged solid state power controllers into a single status message and communicating said single status message to said main control unit; and
providing each of the plurality of control signals to a corresponding solid state power controller in said ganged set of solid state power controllers.

12. The method of claim 11, wherein outputting a control message from said main control unit comprises outputting a plurality of control messages with each of said plurality of control messages corresponding to a set of ganged solid state power controllers in a plurality of sets of ganged solid state power controllers.

13. The method of claim 12, wherein at least one of said sets of ganged power controllers in said plurality of sets of ganged power controllers is a single solid state power controller.

14. The method of claim 12, wherein at least one of said sets of ganged power controllers in said plurality of sets of ganged power controllers is more than one solid state power controller.

* * * * *